(12) United States Patent
Frankefort et al.

(10) Patent No.: US 8,545,210 B2
(45) Date of Patent: *Oct. 1, 2013

(54) METHOD AND DEVICE FOR THE MOLDING OF WOOD FIBER BOARD

(75) Inventors: Maurice Frankefort, Aix-en-Provence (FR); Alex Charles, Wellington (NZ)

(73) Assignee: Masonite International Corporation, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/302,584

(22) Filed: Nov. 22, 2011

(65) Prior Publication Data

US 2012/0125484 A1    May 24, 2012

Related U.S. Application Data

(60) Division of application No. 12/637,492, filed on Dec. 14, 2009, now Pat. No. 8,062,569, which is a continuation of application No. 11/045,368, filed on Jan. 31, 2005, now Pat. No. 7,632,448, which is a continuation of application No. 10/198,179, filed on Jul. 19, 2002, now Pat. No. 6,868,644, which is a division of application No. 09/402,603, filed as application No. PCT/NL98/00233 on Apr. 27, 1998, now Pat. No. 6,500,372.

(30) Foreign Application Priority Data

Apr. 25, 1997  (WO) .................. PCT/NL97/00228
Jul. 18, 1997  (NL) ..................... 1006615

(51) Int. Cl.
*B29C 43/02*  (2006.01)
*B29C 43/20*  (2006.01)

(52) U.S. Cl.
USPC ........... 425/394; 425/384; 425/385; 425/395; 425/396; 264/322

(58) Field of Classification Search
USPC ................................ 425/394, 398
See application file for complete search history.

(56) References Cited

U.S. PATENT DOCUMENTS 6,364,982 B1 *  4/2002  Lynch et al. ............ 156/196
6,868,644 B2 *  3/2005  Frankefort et al. ........ 52/455

* cited by examiner

*Primary Examiner* — Robert J Grun
(74) *Attorney, Agent, or Firm* — Berenato & White, LLC

(57) ABSTRACT

The invention relates to a method and device with which it is possible to arrange complicated shapes with considerable differences in height in wood fiber board, and in particular but not exclusively so called MDF (Medium Density Fiberboard). The deformation of the wood fiber board which can be achieved is known in the art as extrusion, wherein a considerable plastic deformation takes place accompanied by flow and stretch of the material.

17 Claims, 15 Drawing Sheets

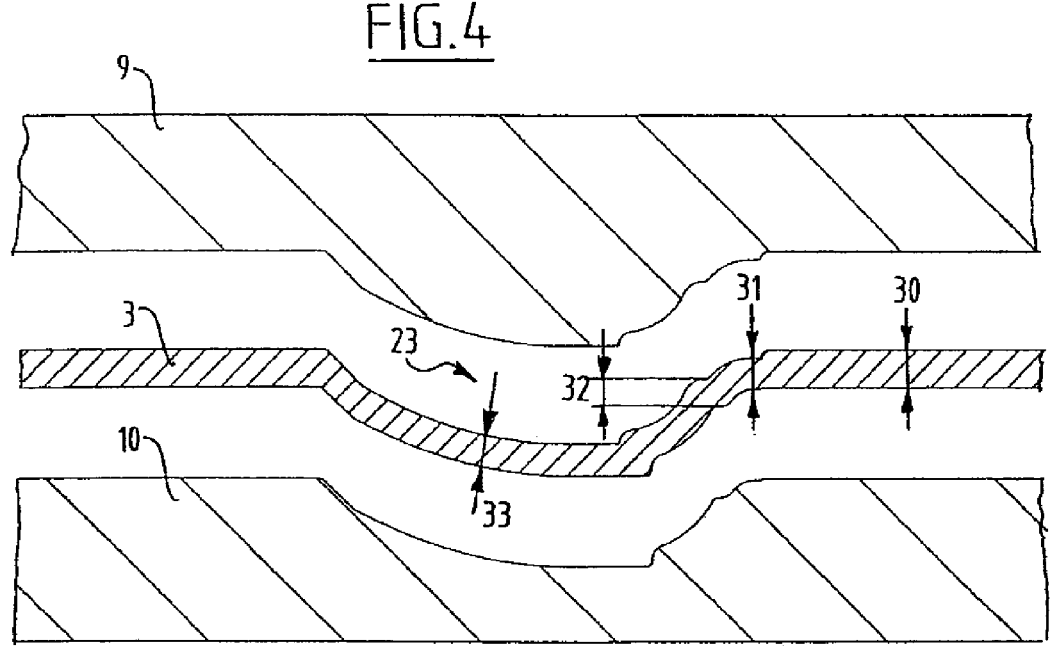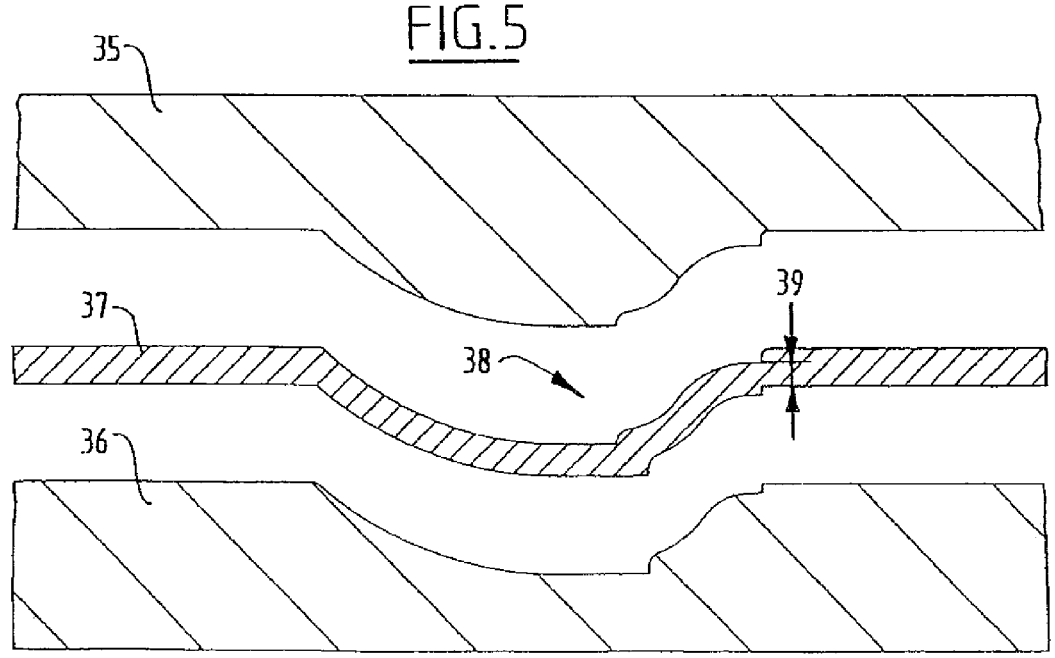

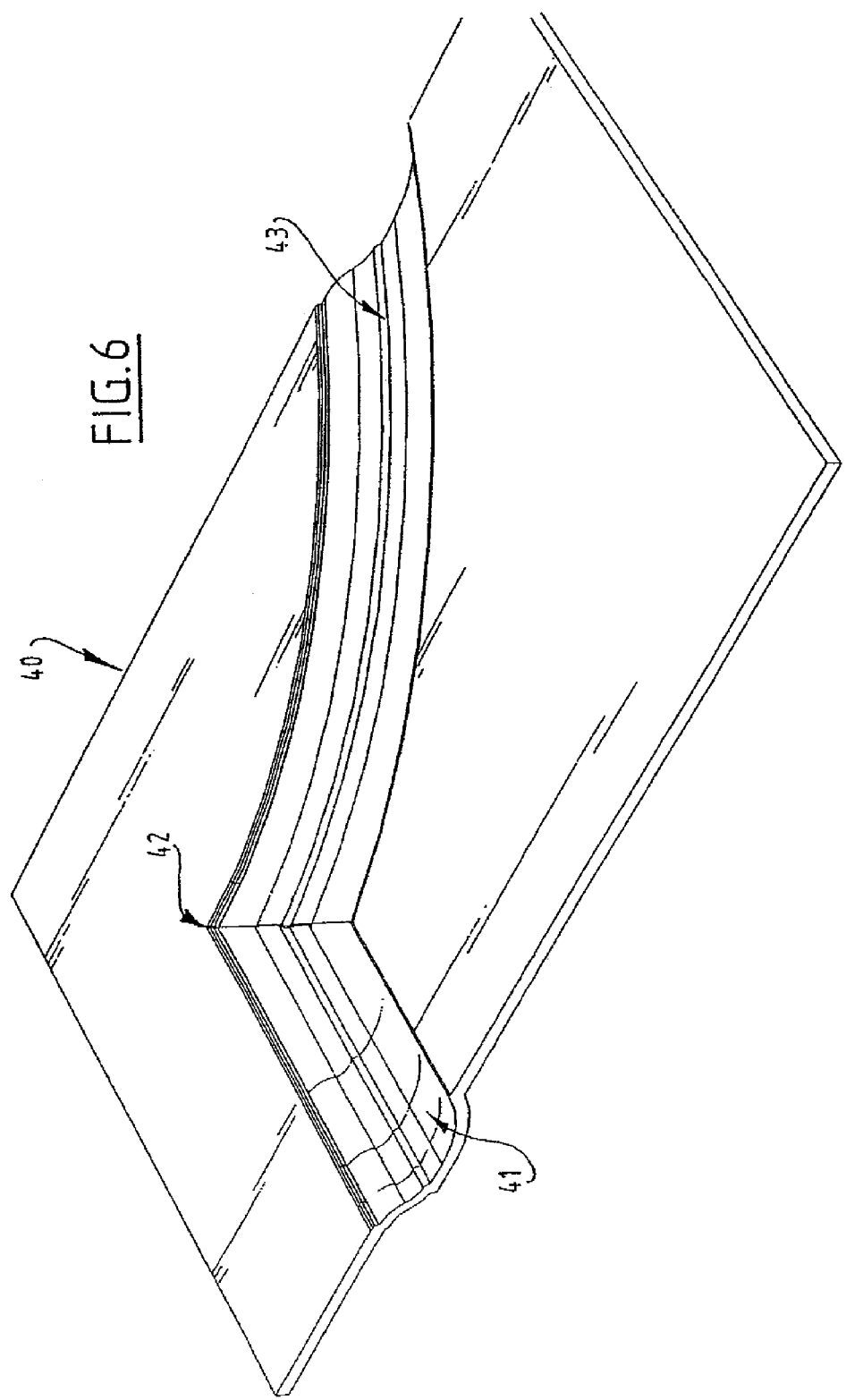

METHOD AND DEVICE FOR THE MOLDING OF WOOD FIBER BOARD

CROSS-REFERENCE TO RELATED APPLICATION AND CLAIM TO PRIORITY

This application is a divisional of application Ser. No. 12/637,492, filed Dec. 14, 2009, now U.S. Pat. No. 8,062,569, which is a continuation of application Ser. No. 11/045,368, filed Jan. 31, 2005, now U.S. Pat. No. 7,632,448, which is a continuation of application Ser. No. 10/198,179 filed Jul. 19, 2002, now U.S. Pat. No. 6,868,644, which is a divisional of application Ser. No. 09/402,603 filed Dec. 21, 1999, now U.S. Pat. No. 6,500,372, which claims the benefit of priority of PCT/NL98/00233 filed Apr. 27, 1998.

The invention relates to a method and device which can be used to arrange in wood fibre board, and in particular but not exclusively in so-called MDF (Medium Density Fibreboard) complicated shapes with considerable differences in height. The deformation of wood fibre board which can be achieved with the invention is known as extrusion, whereby considerable plastic deformation, accompanied by flow and stretch of the material takes place.

The deformation of wood fibre board is known as such. From the International patent application WO96/03262 for instance a method is known with which it is possible to bend wood fibre board to a bending radius of minimally 2.5 times the thickness of the board material.

From other publications, such as for instance the European patent application 0 420 831 it is known to provide wood fibre board with a surface profiling by subjecting this material to a pressing operation. In this case the required profile is formed by locally varying compression of the material.

The deformation which can be effected with the invention can be much more comprehensive than the deformation which is achievable with the state-of-the-art methods.

The invention will be explained in greater detail in the following description with reference to the attached drawings.

FIG. 4 shows a cross-section of the door skin of FIG. 3 along the line indicated by arrows IV-IV, together with the corresponding mould parts.

FIG. 5 shows a view corresponding to figure of another embodiment.

FIG. 6 shows a cut away perspective view of another embodiment of a door skin.

Figure 1:
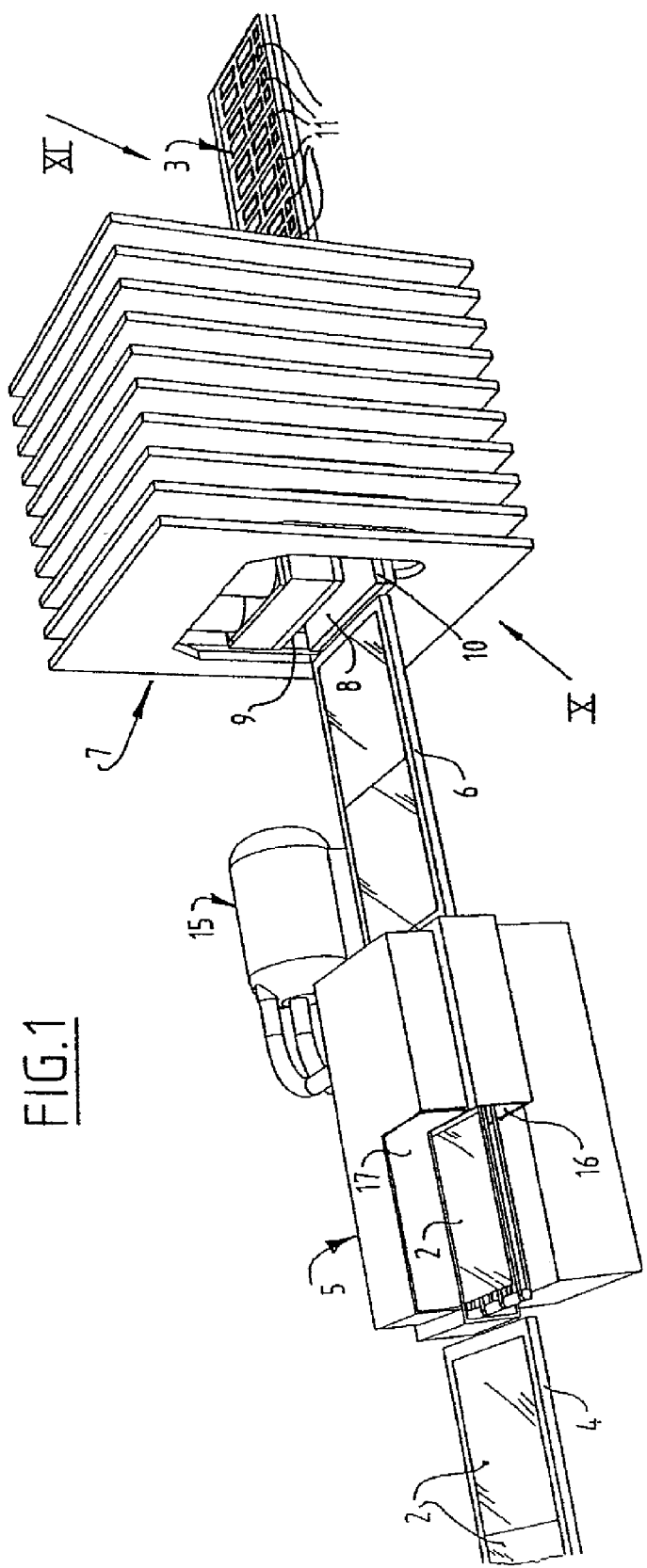
FIG. 1 illustrates schematically a device according to a preferred embodiment of the invention.

In general, the device 1 as illustrated in FIG. 1 comprises a conveyor 4 on which wood fibre boards, in particular MDF boards are conveyed. The conveyor 4 takes boards 2 into a chamber 16 of a forming station 5. In this chamber 16 the boards 2 are heated in a manner to be described below in detail and treated with steam in such a way that the material reaches it thermal softening point.

In this softened state the boards are taken from the forming station 5 into the forming area 8 of a press 7. This is done with a conveyor 6.

In the press 7 the forming area 8 is bounded at the top and bottom by an upper mould 9 and a lower mould 10 respectively which delimit in the closed state of the press a specifically shaped mould cavity which will be described in greater detail below.

Next the press 7 is activated as a result of which the upper mould 9 is moved in the direction of the lower mould 10, whilst the thermally softened wood fibre board is positioned in between.

By a carefully defined course of movement of the upper mould 9 to be described in greater detail below, the wood fibre board will be considerably plastically deformed as a result of which a complicated profile can be arranged in it. With the example of the embodiment shown two wood fibre boards can be processed simultaneously, in which altogether six door skins will be formed, i.e. three door skins per wood fibre board 2.

In the mould parts 8,9 knives have been formed at the edges in between the separate door skins which cut grooves 11 in the boards at the edges of the door skins along which the boards can be broken easily.

The lower and upper mould 10, 9 which can, as explained above, form in this embodiment six door skins placed next to one another, have preferably been made up of six separate upper and lower mould parts, one for each door skin to be formed. The specific embodiment of the door skins to be manufactured can thus be altered per mould part, so that the production may be adapted to the demand for specific models.

Before the boards 2 are moved into the forming area 8 of the press by means of the conveyor 6, a sheet of plastic may be arranged on top of it which may be joined during the pressing operation with the top surfaces of the boards 2. A very suitable material for this purpose is melamine paper. The ultimate product will in that case obtain a synthetic surface which is desirable for certain applications. Additional finishing operations to the objects produced, such as the door skins 3, are consequently no longer necessary.

The method and device according to the invention have been described above in very general terms. The different sections will be explained below in greater detail.

An important aspect of the method according to the invention is the choice of the basic material. Both where the wood fibre material, and if applied, the melamine paper are concerned.

It has become apparent that where the choice of wood fibre material is concerned the maximum thermal softening which can be attained and the temperature at which this is achieved are decisive. The thermal softening point is a function of the wood species and the chemical properties of the board material. Also important are the cellular moisture content and the quantity of heat supplied. Softening at as low as possible a temperature is favourable.

The selection of a favourable basic material can be made experimentally by establishing for a test piece the thermal softening point and the degree of thermal softening at that point. It has become apparent that material made of a wood fibre with long fibres is favourable. In particular pine is very suitable to be used as basic material. Preferably radiata pine is used, for which the thermal softening already starts at 95° C.

For the melamine employed a type of paper is chosen which reacts slowly, as opposed to the fast reaction which is normally required for lamination purposes et cetera. The curing time should be longer than 10 seconds and preferably be something like 20 seconds. Thus it is possible that the curing of the melamine only takes place after the wood fibre board has been deformed maximally.

In order to be able to take up the required strong deformation, preferably a material with a carrier of shrunk i.e. crepe paper is used.

The treatment during which the board material acquires the softened state takes place in the forming station 5. The chamber 16, inside of the which the boards 2 to be treated are received, can be closed off hermetically. In the forming station 5 vacuum pumps which have not been illustrated have been arranged, which create a partial vacuum inside the chamber 16 and the the boards 2 have been received in the chamber 16 and the latter has been closed. When a suitable underpressure has been reached, steam from a boiler 15 is introduced into the chamber 16. Due to the steam supplied the pressure inside the chamber 16 will rise again to roughly atmospheric pressure and at the same time the steam will also quickly penetrate the pores of the wood fibre board 2.

The steam exhaust in the chamber 16 consists of a number of nozzles arranged in the bottom of the chamber pointing upwards, which squirt the steam supplied like a jet against the underside of the board 2. As a result and together with the sucking action due to relieving the underpressure, penetration of the steam is achieved.

In the boiler 15 the steam is generated under an overpressure of several bars, preferably more than 10 bars. Due to the expansion in the chamber 16 the temperature of the steam will drop to just above 100° C. and immediately some of the steam will condensate inside the board. The board is both heated and moistened.

In addition to being heated due to direct contact with the steam, the boards 2 inside the forming station 5 are heated due to the fact that the walls of the chamber 16 themselves are heated and give out heat to the boards 2 received in the chamber 16 by means of radiation. In the example of the embodiment illustrated here, the cover 17 of the chamber 16, which may be a lid, is hollow and has been connected to the steam supply. The cover of the chamber 16 will as a result obtain a high temperature corresponding to that of the steam inside the boiler 15, which temperature is consequently higher than that of the expanded steam inside the chamber 16.

Because of this high temperature of the cover of the chamber 16, proper heating of the board 2 by means of radiation will take place, whilst it is also prevented that the expanded steam will condense against this cover. It has been found that drops of water on the boards 2 will result in serious defects in the final product. By heating the cover of the chamber 16 until it has substantially the same temperature as the steam used for expansion condensation is prevented.

The generated steam has consequently two functions. In the state with a higher pressure and temperature it serves for heating the walls of the chamber 16 and in particular the cover thereof and in the expanded state inside the chamber 16, when the temperature and the pressure are lower due to the expansion, it serves for moistening and heating the boards 2.

The greater the underpressure in the chamber 16 prior to the supply of steam, the shorter the duration of the treatment of the boards. It has been established that at the pressure of 0.8 bar mentioned, the duration of the treatment of wood fibre boards of the radiata pine referred to above, will be 15 to 30 seconds. This is already considerably shorter than the pressing cycle time of the press 7, so that the duration of the treatment in the forming station 5 is not decisive for the production cycle.

With other kinds of wood a greater underpressure may be required in order to attain the required short duration of the treatment after all, so that it does not affect the cycle time of the production. The duration of the treatment of MDF board of wood fibres of the rubber tree (haevea brazilienzis) takes at an underpressure of 0.8 bar four times longer as, when using that material, such a low underpressure is not sufficient. The underpressure will have to be greater in order to achieve a suitably short treatment time.

By way of compensation for the loss of heat during the following transport phase, the wood fibre material in the forming station 5 is heated as much as possible, but not so high that it would become too weak to be handled when it has to be positioned inside the press.

In practice it has been found that a temperature of about 100° C. is the most suitable for an MDF board with a thickness of 3.8 mm made of the radiata pine wood fibre mentioned above.

When the wood fibre boards 2 have been pre-treated in this manner, they are subjected to the real extrusion treatment in the press 7.

To achieve Maximum deformation during the extrusion treatment, careful control of the pressing cycle and a specific design of the mould cavity are important in addition to the choice of the basic material and the softening.

This last aspect will be explained in greater detail with reference to an example of a product to be manufactured with the method and device according to the invention, that is to say the door skin 3 mentioned above, as illustrated in greater detail in FIG. 2.

Figure 2:
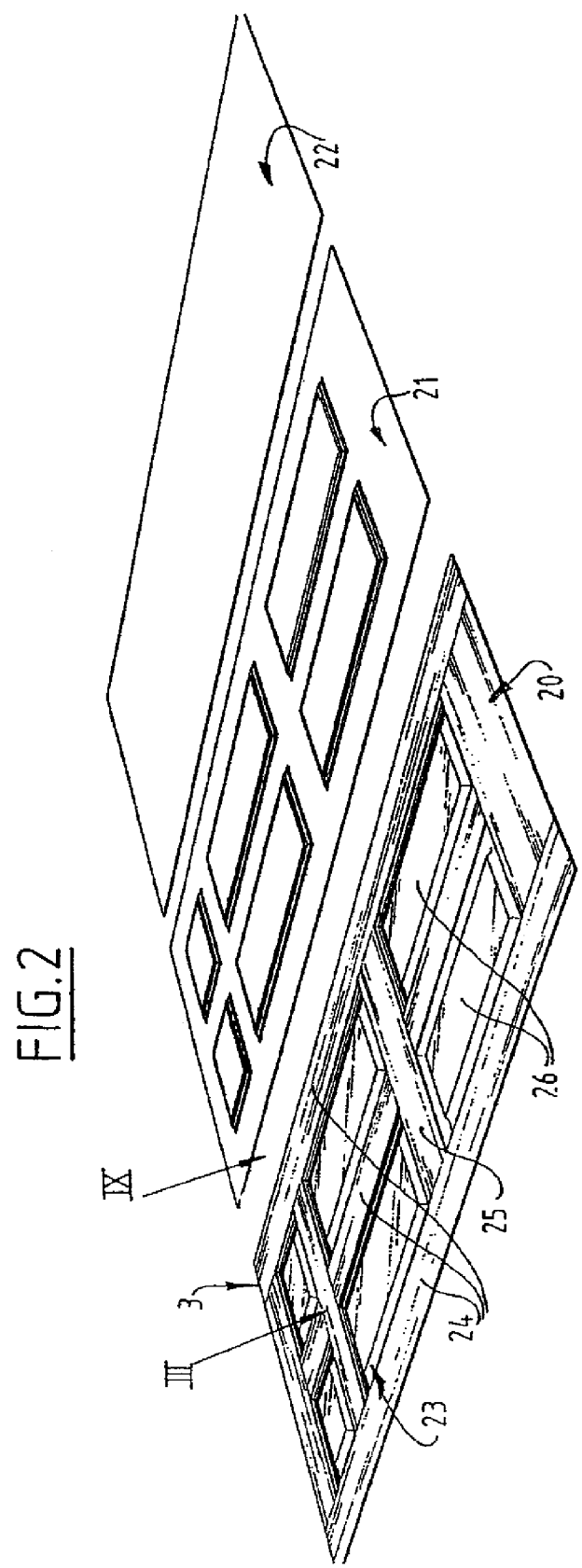
FIG. 2 illustrates a door skin manufactured with the device and method according to the invention.

FIG. 2 shows at 20, 21 and 22 the front side, the back side and the basic material respectively of a door skin 3 manufactured with the method and device according to the invention. Such a door skin 3 will be arranged on a wooden framework in a manner known as such, whereby a similar or other door skin 3 will be arranged to the other side of this framework. The assembly thus formed forms a door which has the appearance of a door made up of posts 24, cross pieces 25 and received in between those, panels 26. This appearance is obtained by extruding profiles 23 in a board of basic material 22 in the manner indicated.

It will be clear that the total surface area of the door skin 3 is larger than that of the board of basic material 22. In order to form the profiles 23 material of the board is moved from adjoining sections into this profile.

Figure 3:
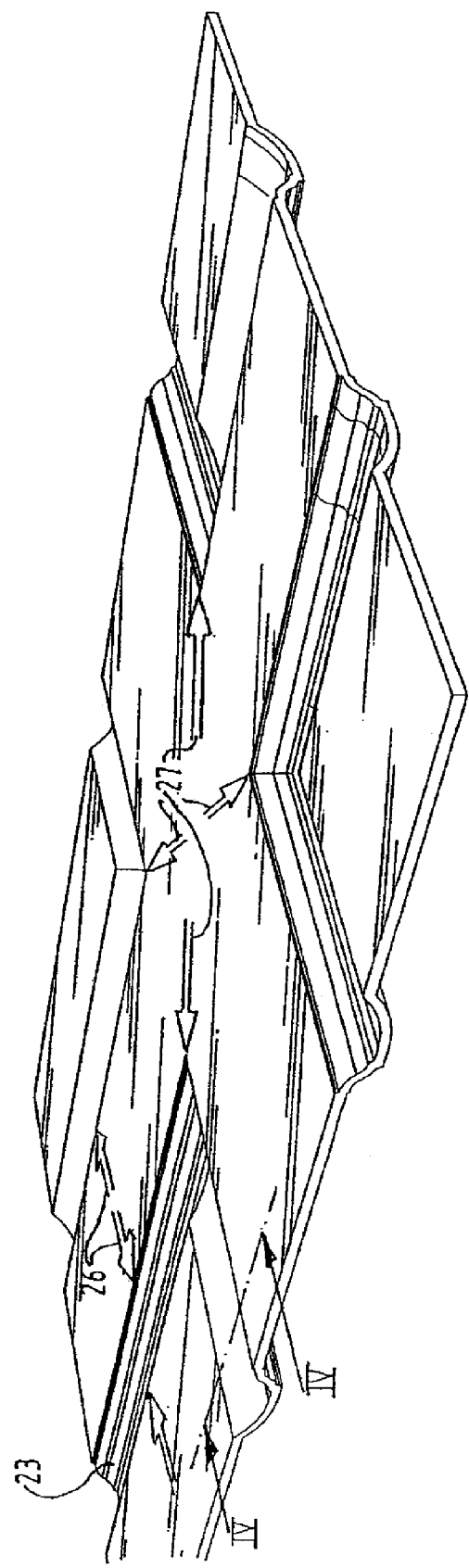
FIG. 3 shows a detail of the section as indicated by arrow II in FIG. 2.

FIG. 3 shows a detail of the section indicated by arrow II in FIG. 2, in which the arrows 26, 27 indicate the movement of the material in the direction of the profile 23 during extrusion. It will be clear that especially in the cross in which the arrows 27 have been drawn a particularly critical situation arises as regards the strain put on the material of the board during extrusion. The forced movement of the material could lead to tearing, or in less serious cases to debonding of fibres at the surface.

With the method and device according to the invention it is possible to subject wood fibre material to such extrusion treatment which puts the material under tremendous strain.

An important measure of the invention is controlling the movement of the material during extrusion. By means of measures to the moulds to be explained in greater detail below, it is ensured that the direction from which the material during extrusion flows towards the profile is controlled, so that it is for instance prevented that too much material from the central section of the cross illustrated in FIG. 3 flows to the profiles in the direction indicated by the arrows 27, as a result of which the damage to the material as mentioned above could occur.

This effect is achieved because the mould cavity comprises in the closed state of the mould local constrictions which grip the board material, and retain it before the complete deformation has taken place. The flow of material via this narrowed section is consequently counteracted. In FIG. 4 an upper mould 9 and a lower mould 10 have been illustrated at a certain distance from one another with a just moulded door skin 3 in between. The shape of the door skin 3 corresponds to the shape of the mould cavity in the closed state of the upper and lower mould 9, 10. The section illustrated in FIG. 4 concerns the section in which part of the profile 23 is formed. The local constrictions of the mould cavity have been indicated with the arrowheads 31, 32 and 33. For the deformation of an MDF board of for instance 3.8 mm, the general height of the mould space indicated with the number 30 will be roughly 3.2 mm. This means that also in those sections which are not extruded directly there will be a compression of material.

At the narrowed sections 31 and 32 the mould height is for instance roughly 2.7 mm. At 33 the height of the mould cavity is once again 3.2 mm.

It will be clear that when closing the mould first, a gradual stretch and flow of the material from all directions will take place in the profile 23. With the last (3.8−2.7=) 1.1 mm of the stroke of the press the board is already retained at the constrictions 31 and 32. During the last part of the stroke, when the details of the profile are being formed, and when locally the greatest strain on the material may be experienced, there will be no more flow into the profile 23 from the right. Also the area in between the arrows 31 and 32 is enclosed and no more movement of material can take place there. The movement of material still required for the formation of the bottom section of the profile will come from the left. As the left side of the profile has less details, material strain during flow from that direction will remain limited.

Because of these local constrictions 31 and 32 it is consequently prevented that during the last stage of the formation of the profile, material form the right is being pulled into the profile as a result of which too great a material strain at the right hand side of the profile could occur, resulting in tearing and debonding of fibres at the surface of the board 3.

A further important measure is that the mould parts 9 and 10 have been heated, and that consequently, due to contact with the board 3, this board is heated even further. In the narrowest sections of the mould cavity, in this embodiment at the arrows 31 and 32 the first narrow contact between the mould parts 9 and 10 and the board takes place, as a result of which these areas are heated first and the most. The plasticity of the board increases due to the increase in temperature, which contributes to the required flow of the material during the extrusion.

An additional effect of the constrictions in the cavity of the mould is that fibres which may have become debonded after all, are pressed under great pressure into the surface of the board. The suitable wood fibre boards such as MDF boards comprise a binding agent which usually is not fully hardened yet. Due to the strong pressure and the heating, further hardening of this binding agent will take place, whereby in the state following extrusion the wood fibres will be bonded well. Fibres which may have become debonded at the surface following movement of material are bonded once again firmly to the material in this manner.

In FIG. 5 a section of an upper mould 35 and a lower mould 36 are shown with a section of a board 37 just formed in between. In the case of this embodiment the profile 38 is somewhat simpler than the profile 23 of FIG. 4. As a result one narrowed section will suffice, which has been indicated with the arrowheads 39 at the right hand side of the profile, with which it is prevented that following the initial deformation more material will flow from the right into the mould cavity forming the profile.

Although with the example of the embodiment shown the shape of the mould cavity is essentially everywhere the same, in certain cases the local constrictions of the mould cavity may vary along the length of the profile. It will be clear that for instance the movement of material will be the most critical at an corner in the profile, and that consequently the control of the movement of material needs to be properly managed. At other locations along the profile less stringent requirements as regards this control may apply.

As has already been illustrated in the example of FIG. 6, showing a section of an extruded board 40, the risk of damage to the material as a result of too much strain applied to the material due to uncontrolled movement of material will be greatest at the corner 42 in between the profile part 41 and the profile part 43. It goes without saying that close to this section 42 the movement of material during extrusion will have to be controlled by local constrictions in the mould cavity.

As has been illustrated with the embodiment, the local constrictions may be formed by giving the walls of the cooperating mould parts a suitable, fixed shape. It is also possible however to control the movement of material by means of movable elements received in the mould, which at a certain distance of the upper and lower mould retain the board to be extruded in a required manner, so that at that site no more movement of material can take place during extrusion. These movable sections may for instance be formed by steel sliding pieces but also insert pieces made of a rubber-like material are feasible.

The position of the local constrictions or the movable mould parts obviously depends on the shape to be extruded. When designing this shape it should often already be possible to determine where the most critical sections are located and determine based on that where the board to be extruded has to be retained in order to control the flow of material. When, during the first trial pressings, it becomes apparent that damage due to incorrect movements of material occurs in certain areas, the mould can be adjusted accordingly. Considering the above, these adjustments will be obvious for an expert in the field.

Besides the measures described above already which enable extrusion of a wood fibre board with a very complicated shape, measures as regards the pressing cycle are possible as well.

Figure 7:
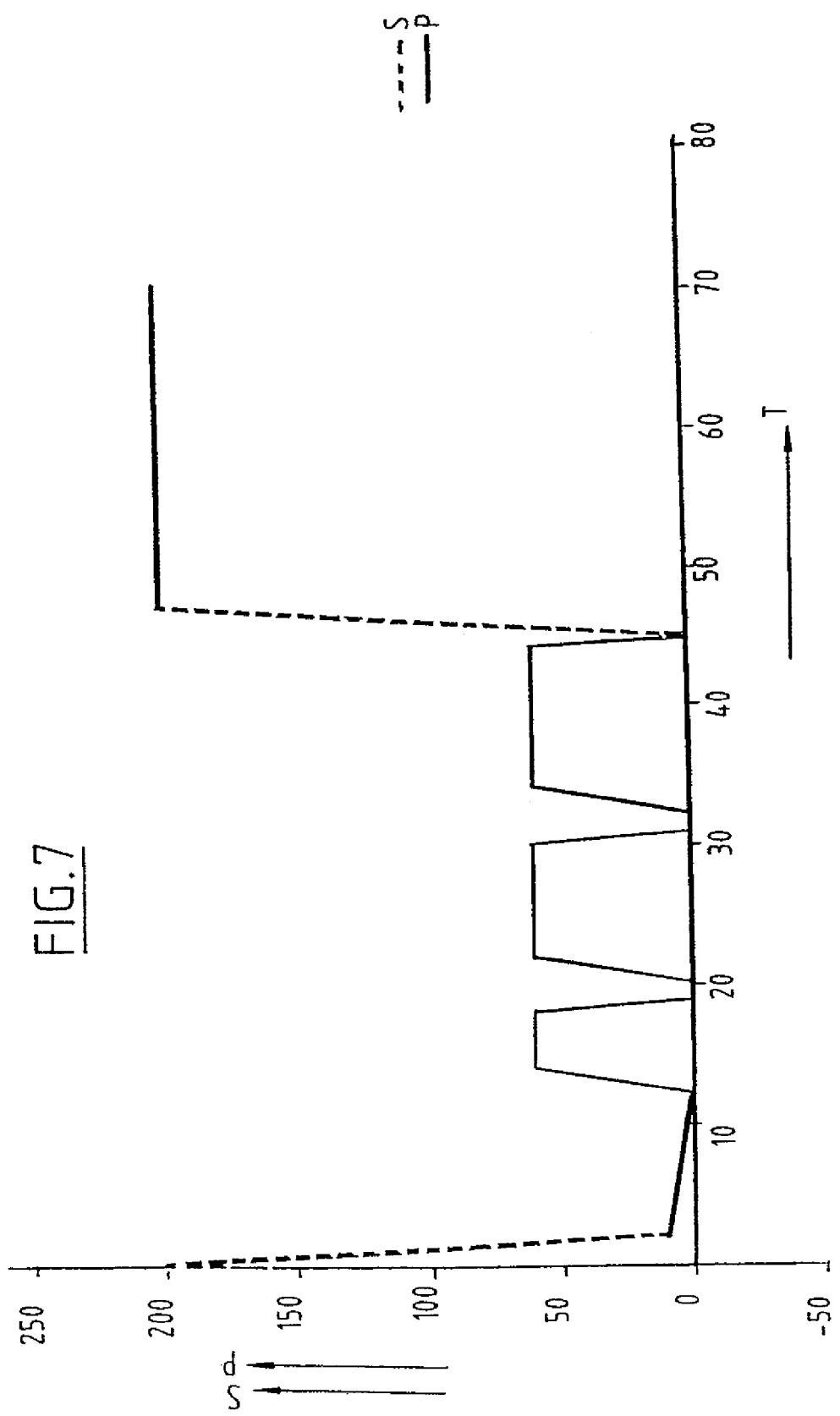
FIG. 7 shows an example of a pressing cycle employed with the method according to the invention.

FIG. 7 shows schematically a suitable pressing cycle as employed with the method according to the invention. On the horizontal axis time is plotted in seconds and on the vertical axis the moulding pressure in $kg/cm^2$ and at the same time the distance between the mould parts in millimeters. The dotted line indicates the distance between the mould parts whilst the continuous line indicates the pressure.

The cycle begins when the softened wood fibre boards have been positioned inside the mould. At that moment the press will close very rapidly until both parts of the mould just make contact with the board. Next the mould closes very slowly until it is closed completely. When the mould is closed completely the pressure is built up and maintained for a certain period of time, after which the pressure falls to practically zero and is built up again after some time. This is repeated once again for reasons which will be explained below. When the pressure has fallen to zero for the third time the mould is opened and the product will be ready to be removed from the mould.

The mould closes rapidly during the first part of the closing cycle in order to achieve as short as possible a cycle time. The second part of the closing cycle is however crucial to proper extrusion treatment.

Figure 8:
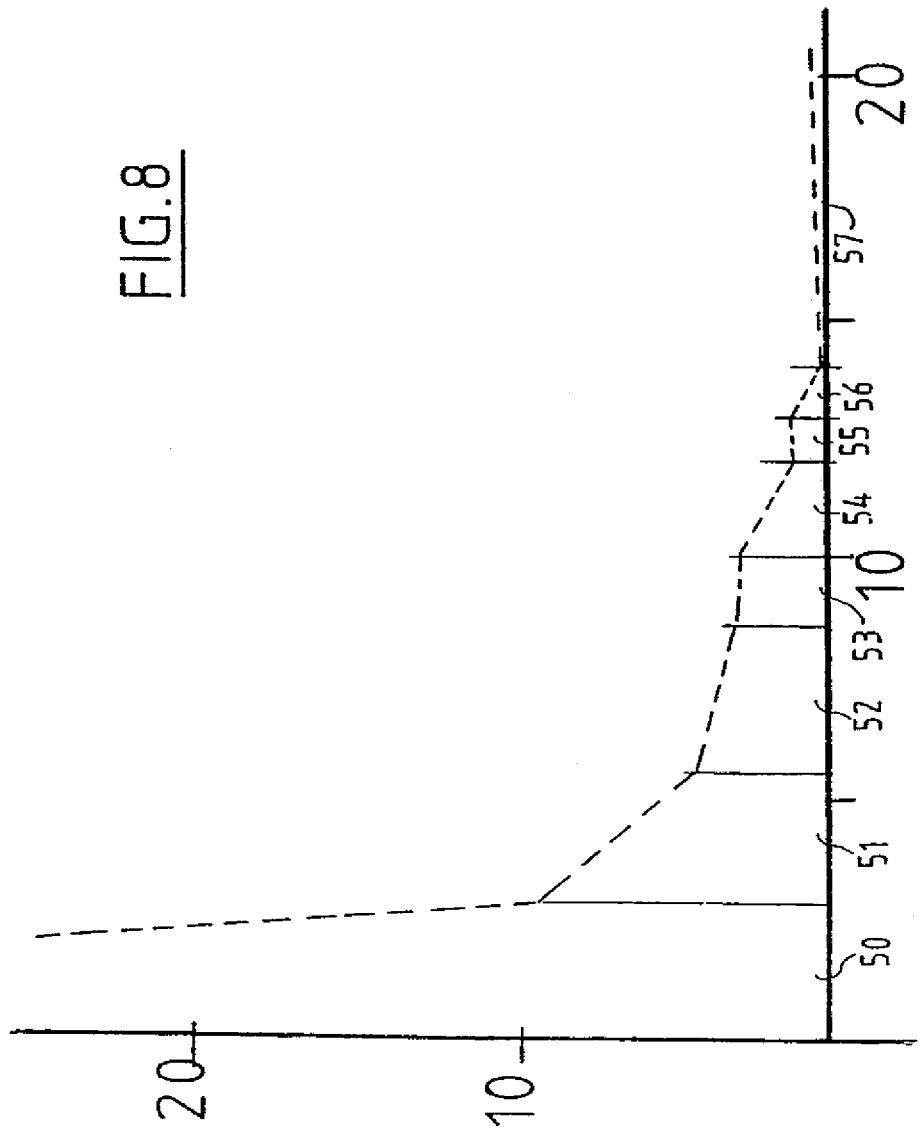
FIG. 8 shows a detail of a pressing cycle.

An example of the closing cycle during this second part has been illustrated in greater detail in FIG. 8. The first step has in this case been indicated with the reference number 50. This is the step during which the mould closes rapidly. At the end of this step the mould parts just make contact with the board. The speed is then greatly reduced during step 51 in order to effect a gradual movement of material to form the rough shape of the profile. Then the speed is reduced further during step 52 and during step 53 the movement is stopped all together. Strains built up in the material may now be equalized and at the same time heating of the board will take place due to contact with the heated mould parts, as a result of which the deformability of the material of the board increases again. Next, the mould closes again a degree further during step 54 and the movement is stopped again during the following step 55. Also during this step the material strains which have built up can be equalized again and the material can flow and stretch. The last part of the closing cycle, during the step 56, takes place gradually again. Then the mould is closed and the pressure is built up.

The course of the graph described here depends on the profile formed. In general the closing speed will be minimal or even zero when the most crucial parts of the profile are being formed. A closing speed which is too high during the moulding phase concerned will be detectable in the final product because material defects, mainly visible at the surface, will occur. These material defects may for instance be loose fibres or uneven surface sections. Based on the final results the expert will be able to ascertain whether in a certain moulding phase the closing speed was too high or whether it could still be a bit higher. Thus the appropriate closing curve can be established experimentally, premise being that the speed should be low or at least almost zero when the deformation caused by the activated mould involves maximal material strain. In addition there should always be sufficient time for heat transfer from the mould parts to certain sections of the material which are about to be deformed significantly.

As has been said before and as can be seen in FIG. 7, the pressure is built up following this specific closing cycle. In FIG. 7 the maximum pressure is just over 60 kg/cm$^2$, but in many cases a lower pressure will suffice like for instance ±40 kg/cm$^2$. The required compression of the material in the case of the example described above of a board with an initial thickness of 3.8 mm to 3.2 mm can then be achieved. In that case the entire board is heated to more or less the temperature of the mould parts, which will for instance be about 200° C. After some time the pressure will be reduced to almost zero. It should be noted that the distance between the mould parts does not alter.

Due to the pressure decrease, the water in the board material, which has been heated well beyond the atmospheric boiling point, will suddenly become steam and this steam will escape sideways between the moulds. Next the pressure is increased again to the maximum value employed and kept at this level for some time, whereby the still remaining water is heated again. Most of this water will escape once again the next time the pressure is reduced to zero, after which for a last time the pressure is increased to the maximum value employed and maintained at this level for some time. After the mould has been opened, the moisture content of the wood fibre material has fallen to a very low value of about 5%.

The drying and degassing cycle described here takes place whilst the mould parts remain in close contact with both sides of the board material. It is thus prevented that due to the expansion of the water, the wood fibre material would be pushed apart which could lead to surface defects of the product. Because the pressure does decrease but the mould parts do not move in relation to one another, the board remains supported over its entire surface area, as a result of which no movement of wood fibres due to the water vapour pressure can take place.

Usually 2 to 3 drying-degassing steps will be required, depending on the water content of the material, the temperature of the mould and other properties of the material. The mould temperature can, depending on the material, be set at a value of for instance 160-200° C.

The closing cycle described with reference to FIG. 8 can, depending on among other things the complexity of the profile, last 20 to 30 seconds. During these 20 to 30 seconds the last 6 to 8 mm of the closing distance are covered in a number of steps.

It will be clear that considering the accuracy with which this movement has to be carried out, the press will have to comply with the strictest requirements. These requirements concern both the accuracy with which the closing speed of the press can be controlled and the accuracy with which the mould parts can be kept parallel in relation to one another.

It must be possible to fully control the closing speed of the press and preferably also to vary the speed between 0.1 to 50 mm/sec. The high speed is required to limit the loss of time when initially closing and when opening the press so as to enable commercial production.

With a press which is part of the device according to the invention, the accuracy of the adjustment of the closing speed is 0.1 mm/sec.

Also the pressure is fully adjustable, preferably in steps of 0.5 kg/cm$^2$ to a maximum of for instance 65 kg/cm$^2$ for the embodiment described here.

In order to be able to manufacture the product described here, i.e. the door skins, in a commercial manner, moulds for making six door skins during one pressing cycle are employed simultaneously. The working surface area of the press is consequently of the order of 2.2×5.6 m. Over this relatively large area the deflection is not allowed to be greater than ±0.1 mm at a full moulding pressure, so that in all sections of the mould the required accurate control of the closing speed in relation to the profile can be achieved.

Also the parallelism of the upper and lower mould must meet high values such as ±0.1 mm.

The maximum operating temperature of the sections of the press to which the mould parts are attached is about 200° C. The temperature variation over the total working area of the press must remain within ±2° C, in order to be able to achieve once again, at every section of the moulds, the required accurate conditions. Preferably those sections of the press carrying the moulds are heated by means of thermal oil. In order to achieve the great accuracy of temperature, conduits have been arranged along the entire length of the platens through which this thermal oil flows in a parallel fashion.

It will be clear that when the extrusion process is less complicated the requirements the press has to meet will be less severe.

Figure 9:
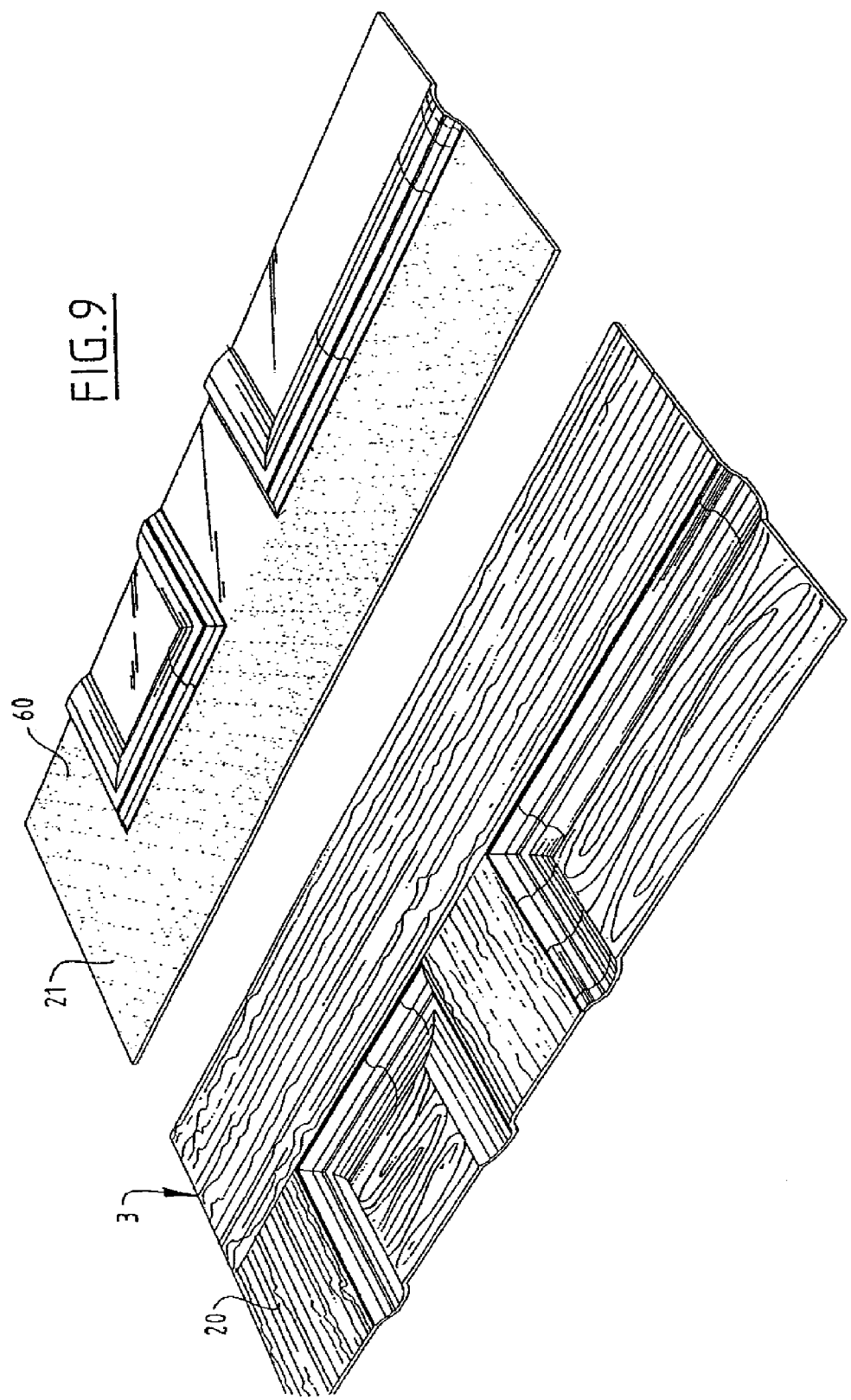
FIG. 9 shows partly perspective views of a front side and corresponding back side of a door skin manufactured with the method according to the invention according to a preferred embodiment.

FIG. 9 shows a partial view at enlarged scale of the section indicated by arrow IX in FIG. 9. The front side 20 of a manufactured door skin 3 and next to it the back side 21 of the same door skin 3 have been illustrated.

It can be seen that a wood grain pattern has been arranged to the front side 20. To this end the upper mould has been provided with a complementary relief. This relief may have been formed in a suitable manner in the surface of the mould by means of photo etching. The relief is transferred to the wood fibre board by impressing it into it. At certain sections the board will be compressed more, as a result of which grooves will be formed which correspond to the lines of the wood grain pattern.

At the back side 21 a pattern 60 has been formed as well. This has also been arranged by means of impressing a relief formed on the lower mould. This relief may also have been arranged by means of photo etching and is such that the back side 21 of the door skin obtains a certain roughness. Because of this roughness glue will adhere very well to the back side 21 of the door skin, so that a door made with the door skin will have a long life span without a risk of the door skins coming loose. The pattern 60 is preferably formed by small set back and protruding sections, the size of some tens of millimeters. In addition to better adhesion of the glue due to the roughness, better adhesion is also achieved because of area enlargement.

Figure 10:
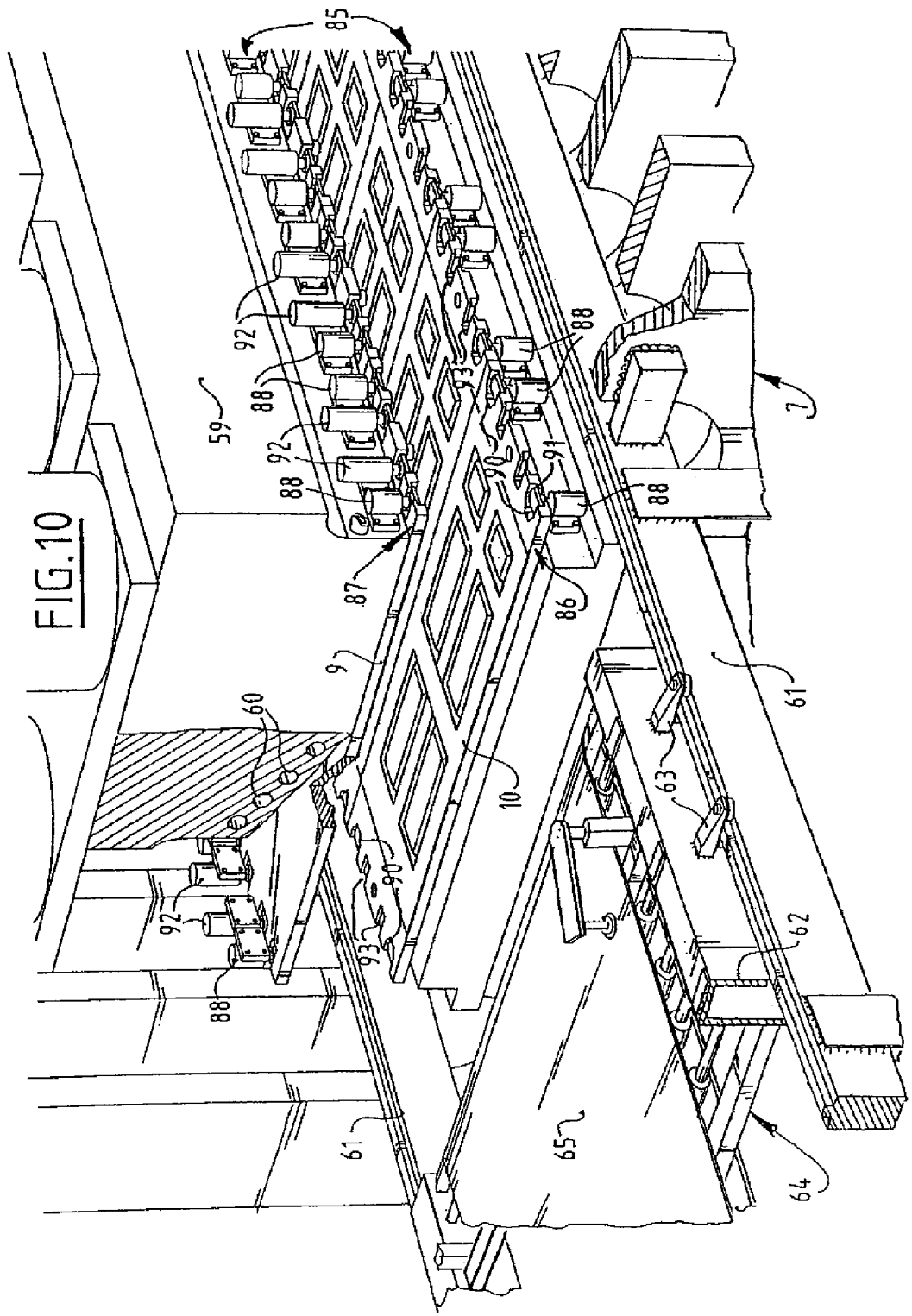
FIG. 10 shows a partly broken away perspective view of an embodiment of the press according to the device of the invention as indicated by arrow X in FIG. 1.

FIG. 10 shows a partly broken away detailed view of the press 7 according to a preferred embodiment of the invention. In this figure the upper and lower mould 9 and 10 can be seen in greater detail and also the fastening means, still to be described, with which they have been mounted to the upper platen or press platen of the press 7 and the lower platen respectively.

Through the broken away section of the press platen 59, the conduits 60 can be seen which have been described above and serve to convey the thermal heating oil.

The loading and unloading of the boards and extruded products respectively is carried out by a supply carriage 62 and a discharge carriage 70 which can move along rails 61 which extend on either side of the lower platen over a distance in front of and behind the press 7. The rails 61 are U-profiles mounted on their sides in which wheels arranged to the frames of the carriages 62,70 can move. The careful cross positioning of the supply carriage 62 is achieved by means of transverse guides 63.

The supply carriage 62 itself has been provided with a conveyor 64 which can consequently be moved along with the carriage 62.

As has been explained before, in this case two boards 2 are taken from the forming station 5 on the belt 65 of the supply carriage. 62, after these boards have been softened in the forming station 5. When leaving the forming station 5 the supply carriage 62 is positioned as far to the left as possible, i.e. in front of the press. The boards supplied from the forming station 5 are positioned carefully on the belt 65. When this has been done the entire carriage 62 enters the press without the conveyor 64 moving. As soon as the carriage 62 has reached a position in which the boards 2 lying on the belt 65 thereof have taken in their correct relative position in relation to the mould, the carriage 62 is moved back whilst at the same time the conveyor 64 is driven at the same speed but in the opposite direction. The boards 2 consequently maintain their relative position in relation to the mould and are positioned correctly in relation to the mould on the lower mould 10. The carriage 62 is pulled away as it were from underneath 10 the boards.

After the boards have been positioned on the lower mould and the supply carriage 62 has been moved back, the pressing cycle described above is carried out for the purpose of extrusion of the door skin 3.

Figure 11:
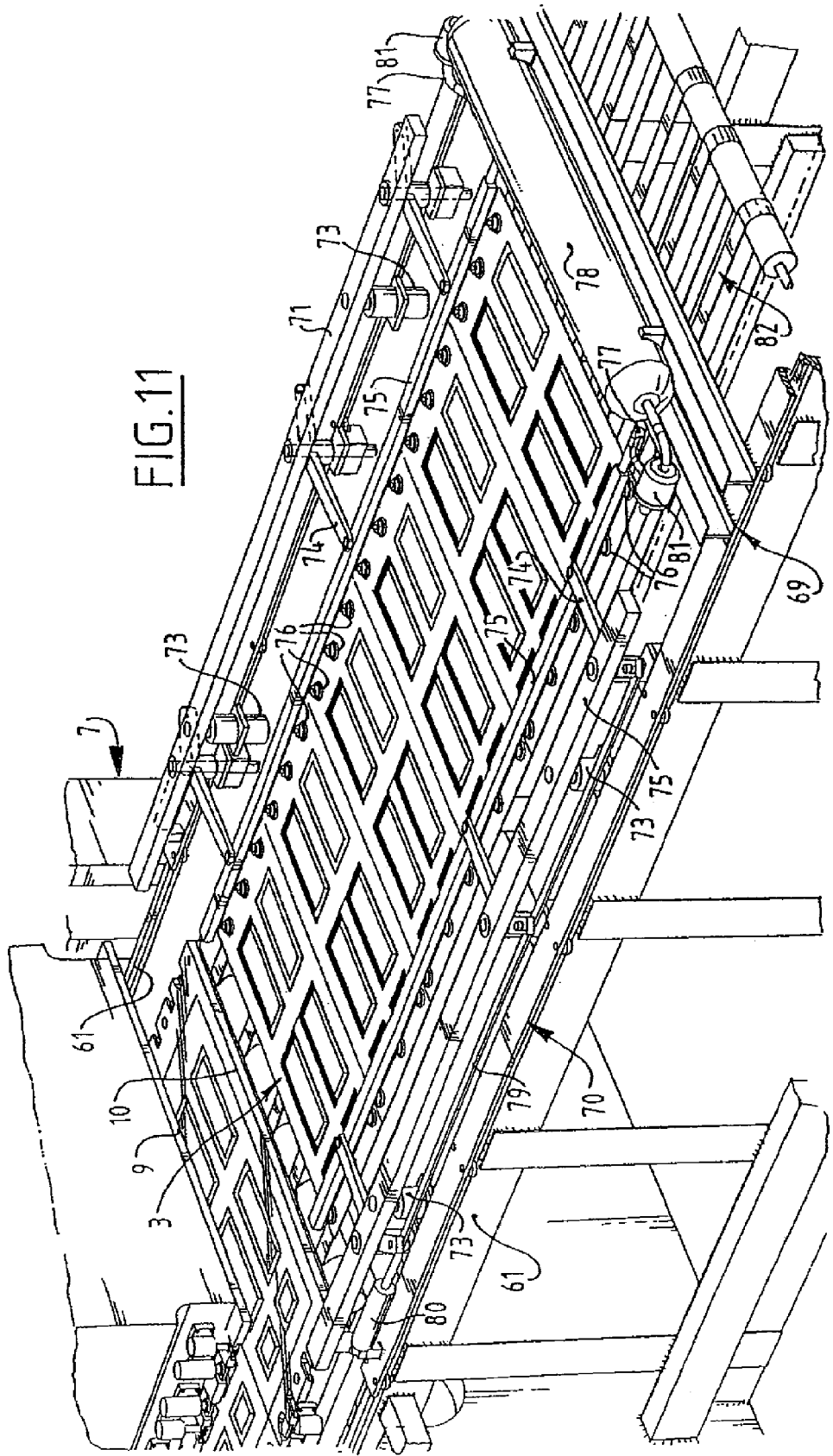
FIG. 11 shows a perspective view of the section as indicated by arrow XI in FIG. 1.

After the press has been opened again, the door skins 3 formed may be taken from the press area by means of the discharge carriage 70 illustrated in FIG. 11. As has been mentioned, this carriage can also move along the rails 61. As can be seen in the figure the carriage 70 20 has a U-shaped frame, whereby the legs of this frame can be moved along the rails 61. Arm carriers 71 have been arranged to the frame 69. These are elongated beams which extend parallel to the legs of the frame 69 and can be moved in a vertical direction between a high and a low 25 position by means of vertical guides 72. Movement of these arm carriers 71 is effected by means of cylinders 73.

Each time three arms 74 have been arranged to the arm carriers 71. These can turn from the projected 30 position illustrated in FIG. 11 to a position turned to the right in FIG. 11, in which they extend substantially parallel to the rails 61. The movement of the arms 74 is controlled by means of a rod 79 which can be moved to and fro by means of a cylinder 80.

At their protruding ends the arms 74 have been arranged in a hinged manner to an elongated suction cup holder 75 which carries a great number of vacuum suction cups 76 at its underside. These vacuum suction cups are connected to a vacuum device 78 via the hollow internal space of the suction cup holder 75 and a flexible conduit 77. Suction by the vacuum device 78 can be turned on or off by means of valves 81.

For the purpose of moving the moulded door skins from the pressing area, the discharge carriage 70 is moved in between the moulds with the arms 74 turned back, until it is level with the door skins 3. Next the cylinders 73 are activated by suitable control means as a result of which the arm carriers 71 move upwards. Then the cylinders 80, on either side of the frame, are activated as a result of which the arms 74 are turned into their position illustrated in FIG. 11. By subsequently lowering the cylinders 73 again the suction cups 76 make contact with the end surfaces of the moulded door skins 3. Next the vacuum is created so that the suction cups attach themselves firmly to the door skin 3. During the next phase the cylinders 73 are activated again for the purpose of lifting the arm carriers 71 so that the door skin 3 is lifted off the lower mould. The discharge carriage 70, with the door skins carried by the suction cups, can then be moved out of the pressing area outside until it is positioned above the belt conveyor 82 arranged there.

Next the door skins 3 are lowered onto the belt conveyor 82 and the suction cups are turned away after which the belt conveyor 82 is turned on and the door skins can be moved away. In the mean time the supply carriage can already place the next board in the press, where the next pressing cycle can begin.

As has been mentioned before, the upper and lower mould of the preferred embodiment of the device illustrated consist of six separate sets of moulds, each for extruding one door skin. In the figures these six sets of moulds have each time been illustrated as being identical, but it is obviously possible to employ different sets of moulds in a suitable arrangement, depending on the required production.

In order to be able to change the production rapidly from door skins to be made with a first series of mould sets to door skins to be made with a second series of mould sets the device according to the invention comprises preferably the rapid fastening system for mould plates. This rapid fastening system will be described below with reference to the FIGS. 10-15.

Each mould part is arranged separately in the press by means of cylinders. Each upper mould part 87 and each lower mould part 86 has been provided with a number of notches along its longitudinal end. Two of these notches 90 are designed to engage the cylinders 88 with which the plate concerned is held to the press. In addition to these cylinders 88 two auxiliary cylinders 92 have been arranged on either side to the movable press platen 59 for each set of mould parts 86,87. The heads thereof, to be described below, can engage in notches 93 in the lower mould part 86.

The mould changing device 85 works as follows.

Figure 12:
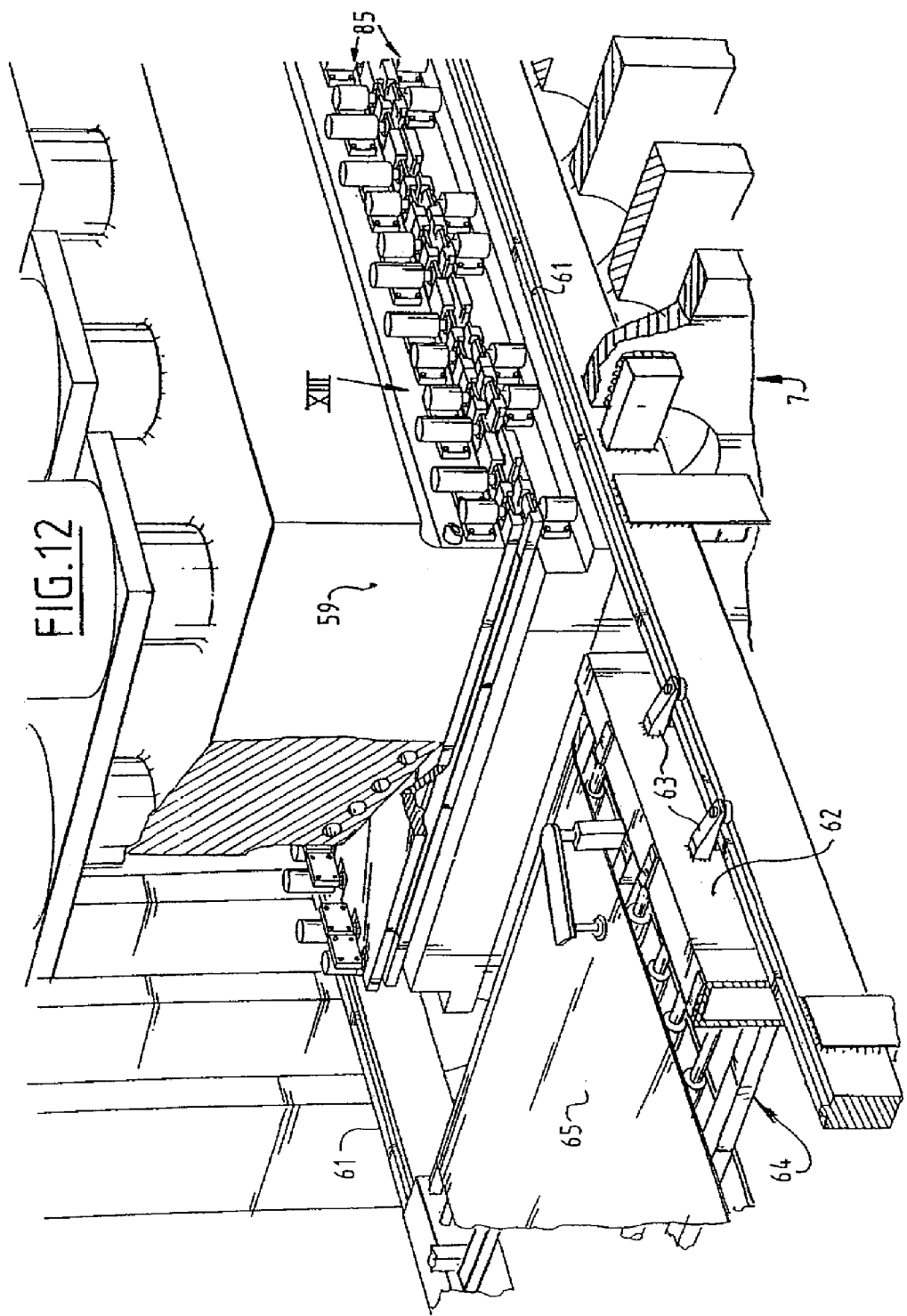
FIG. 12 shows the press of the device according to the invention in the closed state, prior to changing the moulds.
Figure 13:
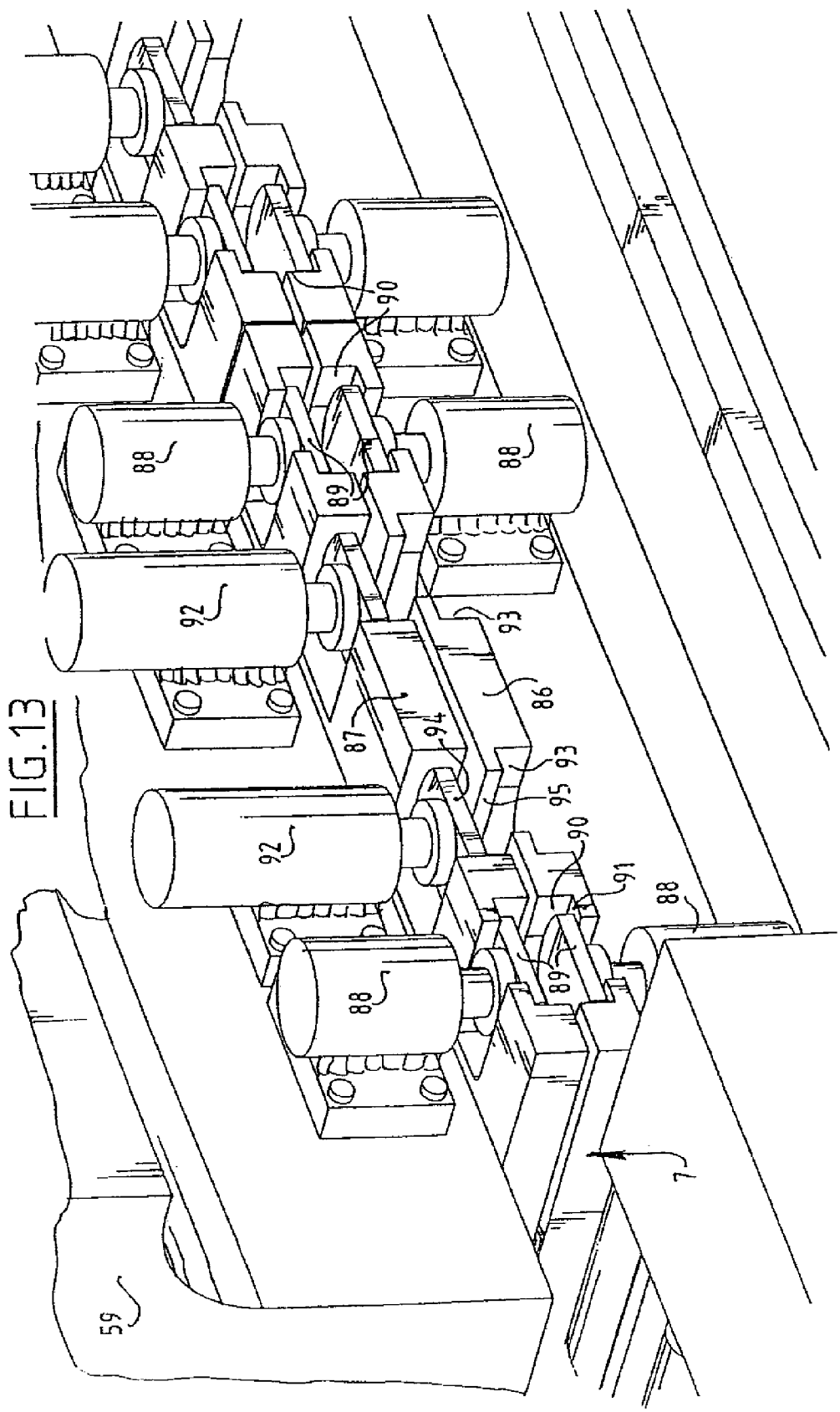
FIG. 13 shows a detailed view of the section indicated by arrow XIII in FIG. 12.

Starting point is the closed position of the press as illustrated in FIG. 12 and in greater detail in FIG. 13. In between the mould parts moulded door skins have been received, so that the mould parts cannot make direct contact with one another so as not to damage them.

In order to be able to change the mould parts, the auxiliary cylinders 92 are activated in such a way that the turning heads 94 thereof are first rotated a quarter turn and are next moved down into the notch 93 of the lower mould part 86 by the auxiliary cylinder 92. Next the turning heads 94 are rotated back a quarter turn and the auxiliary cylinder 92 is activated in such a way that the turning head 94 is pulled upwards. When that happens the turning head 94 fits with it protruding sections under the shoulder 95 of the notch 93 so that they engage the lower mould parts in this manner.

Next the cylinders 88 are deactivated and its turning heads 89 rotated a quarter turn, so that they are released form the cooperating shoulders 91 of the notches 90.

The suction rods of the cylinders 88 are then pulled in so that the turning heads 89 no longer engage the mould parts.

Figure 14:
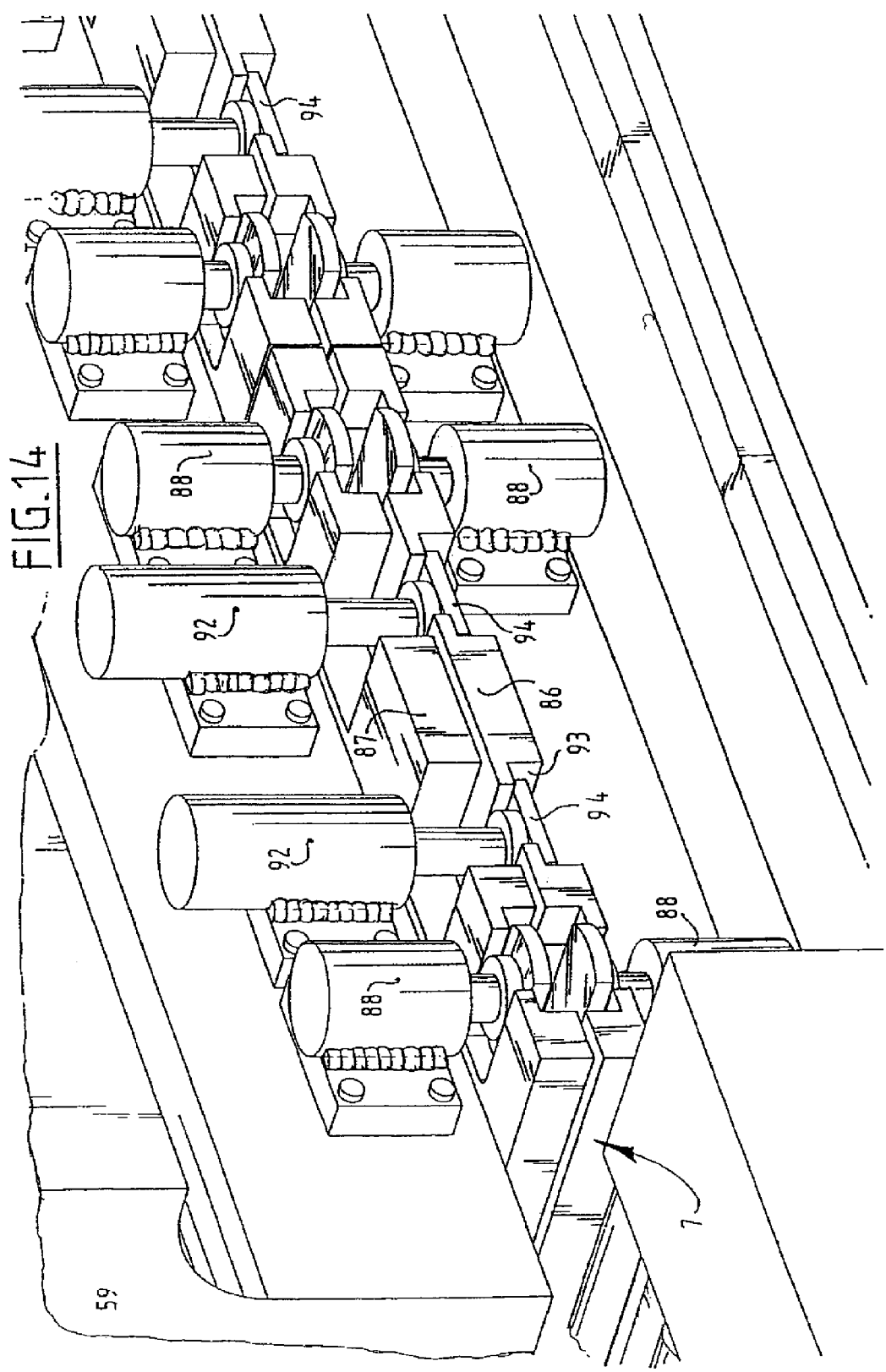
FIG. 14 shows a view corresponding to the one of FIG. 13 during another phase of the action of the changing means.

The situation which has been brought about in this way has been illustrated in FIG. 14. The lower mould parts 86 are now pulled against and retained together with the upper mould parts 87 against the movable press platen 59 of the press 7 by the auxiliary cylinders 92.

Next the press is activated in such a way that the movable press platen 59 moves upwards. The complete upper and lower moulds are moved along and hang from the press platen 59.

Figure 15:
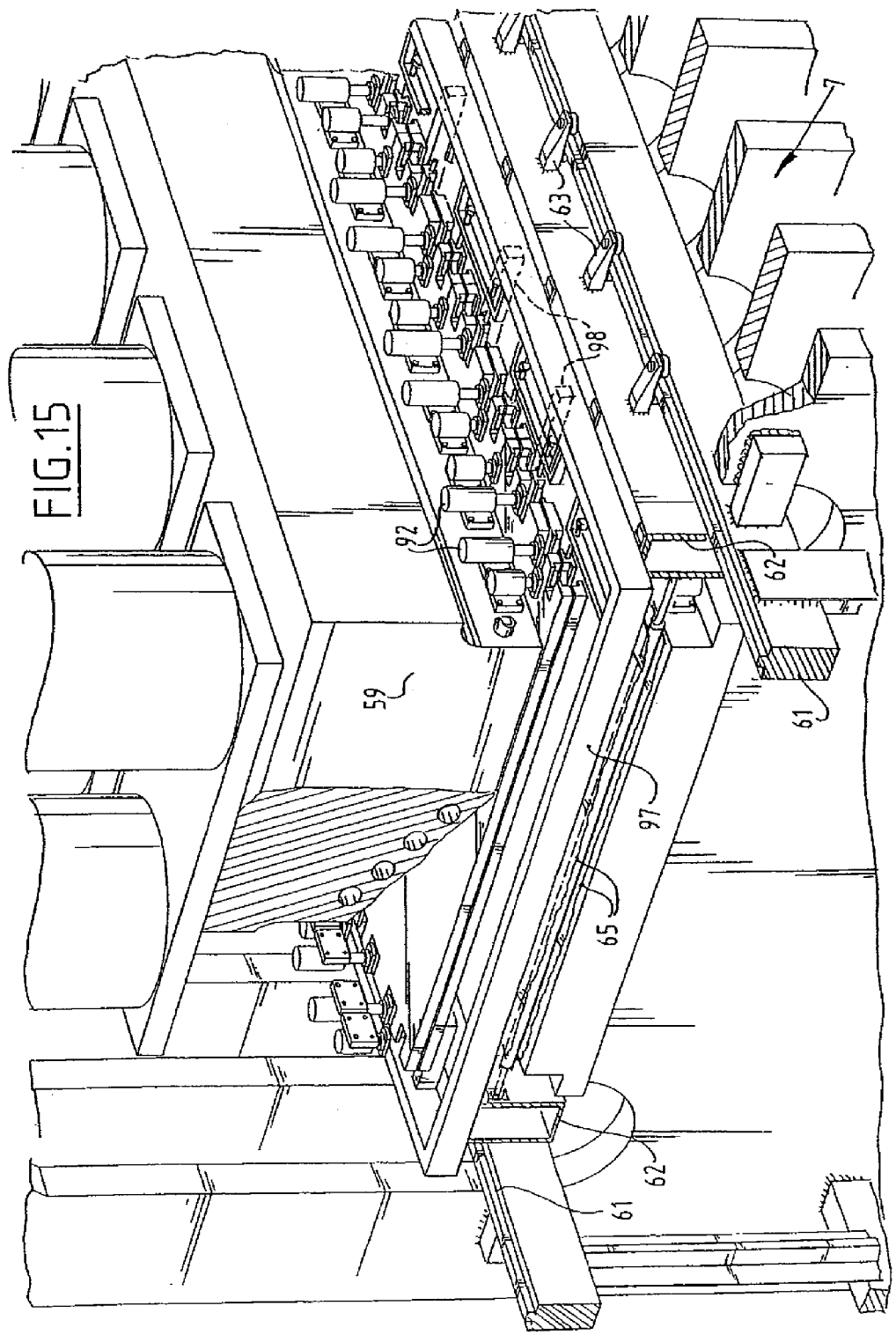
FIG. 15 shows a view corresponding to that of FIG. 12 during another phase of the action of the changing means.
Figure 16:
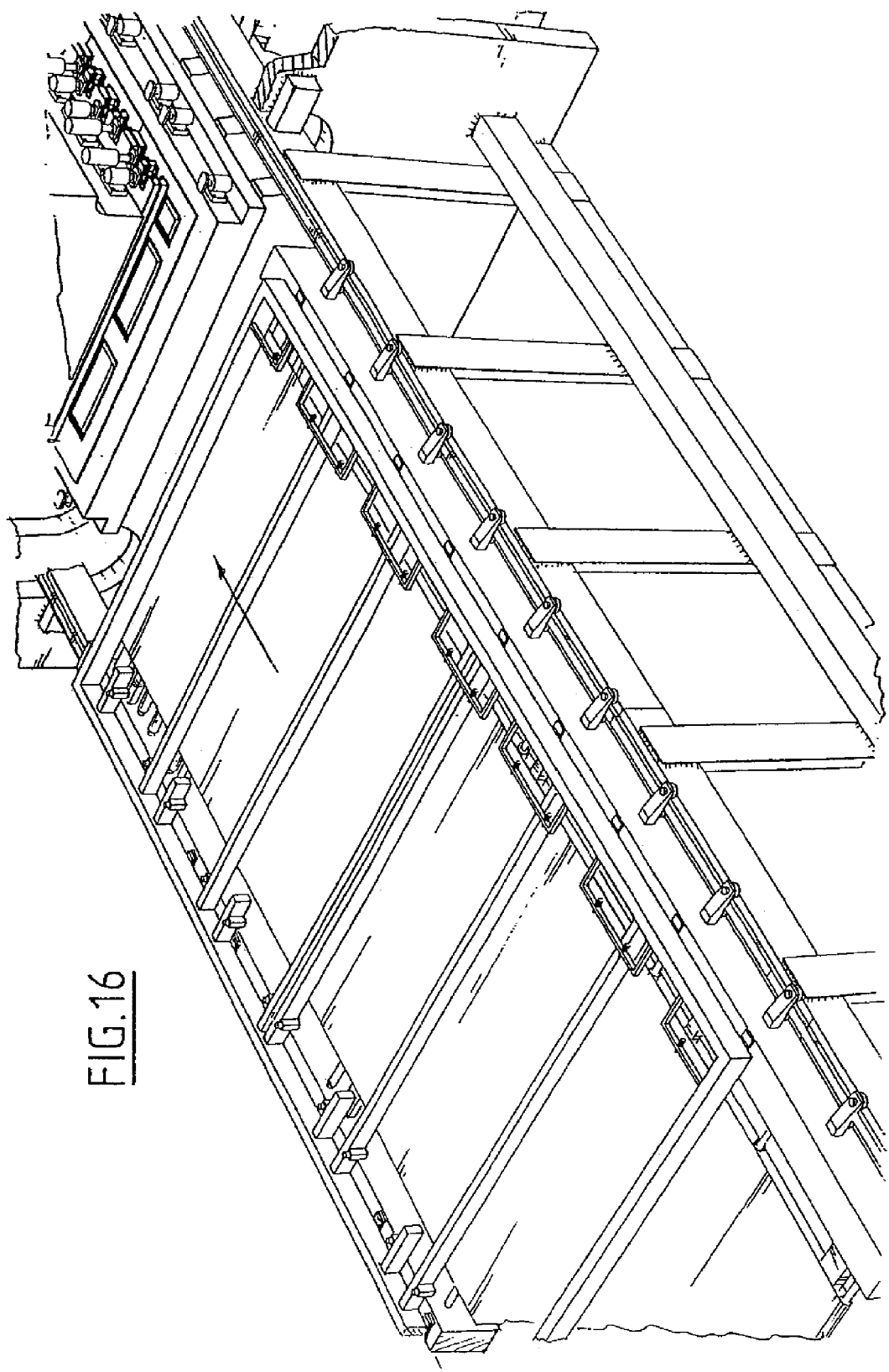
FIG. 16 shows the carrier frame of FIG. 15.

The next phase has been illustrated in FIG. 15. In this figure it can be seen that the supply carriage 62 has entered the pressing area, whereby a carrier frame 97 has been mounted on the carriage 62. When the carriage 62 together with the carrier frame 97 is positioned level with the mould, the press 7 is activated in order to lower the press platen 59 gradually until the lower mould parts 86 rest on the support beams 98 of the carrier frame 97. Then the auxiliary cylinders 92 are activated again in such a way that they move the corresponding turning heads a little downwards, turn them a quarter turn and move them upwards. At that moment the connection with the press platen 59 is broken and the press is activated in order to move the press platen 59 upwards. At that moment the mould parts are supported by the carrier frame 97 and can be moved outside with the carriage 62 out of the pressing area.

A hoisting mechanism not illustrated here can lift the carrier frame 97 from the supply carriage 62 and replace it with another carrier frame 97 with another set of mould parts which can be moved into the pressing area of the press 7 again, after which the auxiliary cylinders 92 engage after moving the press platen 59 downwards. The press platen 59 then lifts the mould parts from the carrier frame 97 and this frame 97 is removed together with the carriage 62 from the pressing area. The press platen 59 can then be moved down again until the lower mould parts are lying on the support of the press. After activating the cylinders 88 concerned and deactivating the auxiliary cylinders 92 the press is ready for use again.

The invention claimed is:

1. A device for deforming a wood fiber board blank into a shaped product comprising:
    a forming press that defines a mold cavity in a closed position, the mold cavity comprising a first planar portion, a second planar portion and a profile portion for forming a first planar region, a second planar region and a profile region between the first and second planar regions in the wood fiber blank, respectively, the profile portion further comprising a flow limiting constriction configured to restrict the flow of the wood fiber material from at least one of the first and second planar regions into the profile region as the wood fiber board lank is being deformed into the shaped product in the mold cavity.

2. The device of claim 1, wherein the forming press comprises an upper die and a lower die.

3. The device of claim 2, wherein the upper die comprises a heatable upper portion and the lower die comprises a heatable lower portion.

4. The device of claim 1, further comprising a heating chamber for heating the wood fiber blank.

5. The device of claim 1, wherein the flow limiting constriction is positioned adjacent one of the planar portions.

6. The device of claim 4, wherein the heating chamber comprises a heated cover.

7. The device of claim 1, wherein the flow limiting constriction is a first flow limiting constriction and the profile portion further comprises a second flow limiting constriction.

8. The device of claim 1, wherein the forming press is operable to form six door skins during a single pressing cycle.

9. A device for deforming a wood fiber board blank into a shaped product comprising:
    a press comprising an upper mold and a lower mold, at least one of the upper mold and the lower mold moveable towards the other from a first position for receiving a wood fiber blank to a second position for forming a molded wood fiber board which defines a mold cavity between the upper and lower molds, the mold cavity comprising a first planar portion, a second planar portion and a profile portion between the first and second planar portions, said first and second planar portions are provided for forming first and second planar regions having a first thickness and the profile region is provided for forming a profile region in the wood fiber blank, respectively, the profile portion further comprising a flow limiting constriction for forming a constriction region having a second thickness less than the first thickness.

10. The device of claim 9, wherein the flow limiting constriction restricts the flow of wood fiber material in the wood fiber board from the planar region into the profile region as the wood fiber board blank is being deformed into the shaped product in the mold cavity.

11. The device of claim 10, wherein the upper mold and the lower mold are heatable.

12. The device of claim 11, wherein the temperature of the upper and lower mold can be set between 160-200° C.

13. The device of claim 11, wherein the temperature variation of the upper and lower mold is within ±2° C.

14. The device of claim 10, wherein the movement of the upper mold and the lower mold is variably controllable between 0.1 to 50 mm/sec.

15. The device of claim 10, wherein the pressure applied by the press is adjustable in increments of 0.5 kg/cm².

16. The device of claim 1, wherein said first and second planar portions lie in different planes.

17. The device of claim 9, wherein said first and second planar portions lie in different planes.

* * * * *